United States Patent
Wan et al.

(10) Patent No.: US 9,305,514 B1
(45) Date of Patent: Apr. 5, 2016

(54) DETECTION OF RELATIVE POSITIONS OF TABLET COMPUTERS

(75) Inventors: Xiaochuan Wan, Nanjing (CN); Xuewen Zhu, Nanjing (CN); Xinfeng Liu, Nanjing (CN); Qiang Huang, Nanjing (CN)

(73) Assignee: Trend Micro Inc., Tokyo (JP)

( * ) Notice: Subject to any disclaimer, the term of this patent is extended or adjusted under 35 U.S.C. 154(b) by 791 days.

(21) Appl. No.: 13/563,319

(22) Filed: Jul. 31, 2012

(51) Int. Cl.
*G09G 5/00* (2006.01)

(52) U.S. Cl.
CPC ........................................ *G09G 5/00* (2013.01)

(58) Field of Classification Search
CPC .................... G06F 3/1423; G09G 2300/026
USPC ...................... 345/1.1, 1.2, 1.3, 2.2
See application file for complete search history.

(56) References Cited

U.S. PATENT DOCUMENTS

| | | | |
|---|---|---|---|
| 6,340,957 B1 | 1/2002 | Adler et al. | |
| 2008/0180550 A1* | 7/2008 | Gulliksson | 348/231.99 |
| 2008/0259093 A1* | 10/2008 | Tseng | 345/619 |
| 2010/0039350 A1* | 2/2010 | Wakefield | G06F 1/1616 345/1.3 |
| 2010/0053164 A1* | 3/2010 | Imai et al. | 345/427 |
| 2010/0064244 A1* | 3/2010 | Kilpatrick, II | G06F 1/1616 715/773 |
| 2011/0109526 A1* | 5/2011 | Bauza | G06F 3/1446 345/1.3 |
| 2011/0158509 A1* | 6/2011 | Li et al. | 382/154 |
| 2012/0007943 A1* | 1/2012 | Tytgat | 348/14.08 |
| 2012/0062758 A1* | 3/2012 | Devine | G01S 5/00 348/222.1 |
| 2013/0093659 A1* | 4/2013 | Nomura et al. | 345/156 |
| 2013/0097649 A1* | 4/2013 | Son et al. | 725/116 |
| 2013/0156336 A1* | 6/2013 | Suk et al. | 382/255 |
| 2013/0222266 A1* | 8/2013 | Gardenfors et al. | 345/173 |
| 2013/0222405 A1* | 8/2013 | Ademar et al. | 345/581 |
| 2013/0225078 A1* | 8/2013 | Johansson et al. | 455/41.2 |
| 2013/0288603 A1* | 10/2013 | Iwasaki | 455/41.2 |
| 2014/0313103 A1* | 10/2014 | Goel et al. | 345/2.2 |

OTHER PUBLICATIONS

"The Matrix," Anywise Enterprise, LLC, iTunes, URL: https://itunes.apple.com/us/app/the-matrix/id411537032?mt=8, Released: Feb 9, 2011.

* cited by examiner

*Primary Examiner* — Jefferey Harold
*Assistant Examiner* — Humam Satti
(74) *Attorney, Agent, or Firm* — Beyer Law Group LLP

(57) ABSTRACT

Tablet computers send relevant geographic and identification data to an application server (one of the tablets, or a local or remote server) which groups them to form a video wall. Once placed next to one another in substantially the same plane, the tablets snap photographs at more or less the same time and these images are transmitted to the application server. The server determines the relative positions of the tablets and then streams a portion of a video or digital image to each of the tablets in order that all tablets display the video or image in an integrated fashion. The tablets may operate independently or may rely upon the remote application server. Relative positions are determined by analyzing features and determining an up-down or left-right relationship between pairs of images, sorting images into vertical and horizontal rows, and placing the images into a grid.

13 Claims, 10 Drawing Sheets

DETECTION OF RELATIVE POSITIONS OF TABLET COMPUTERS

FIELD OF THE INVENTION

The present invention relates generally to image analysis. More specifically, the present invention relates to detecting the relative position of devices having cameras using image analysis of photographs taken with those cameras.

BACKGROUND OF THE INVENTION

The variety and sizes of computing devices available continues to increase. In addition to traditional desktop computers, now common are various sizes of laptop computers, tablet computers, and even mobile telephones (so-called "smart phones") that are basically small computers. Now that these computing devices are ubiquitous, it is not surprising that users often use them for viewing documents, photographs, movies, etc. In particular, due to their size and portability, tablet computers lend themselves well for such viewing. Users have long yearned for a way to create a "video wall," that is, a way to place tablet computers next to one another and have them display a similar single image or movie in a coordinated fashion.

Ideally, a user watching a movie on a tablet computer would be able to place a second tablet computer alongside the first and have both computers not only recognize that they are now next to one another (and to detect which is where), but also automatically merge the two screens into one and display the movie across both computers on a screen which is now double in size. Of course, one could also place two laptop computers next to one another, two smart phones, etc., or use more than two computing devices. While this concept has been promoted, and while certain technologies have been tried, no optimal solution has yet been realized.

U.S. Pat. No. 6,340,957 issued to Adler et al. does show in FIG. 32 placing devices adjacent to one another in order to display an entire image (see also FIGS. 33 and 43-47 showing alternative placements). But, the techniques disclosed to detect relative position are not optimal. Adler discloses using actual physical contact in order to determine the relative location of one tablet to another (columns 15, 16 and 23), but this technique requires special sensors on all sides of each computing device (increasing cost) and requires the devices to be in physical contact (i.e., being very close is not good enough). Adler also suggests that relative location can be determined without physical contact (columns 16, 22 and 23). Adler describes that determining relative location without contact may only be performed using: 1) optical sensors on each device (column 25); 2) radio communication (column 25); 3) a global positioning system within each device (column 25); and, 4) hardcoded programming (column 22). Again, each of these techniques has disadvantages. Using optical sensors requires sensors on each edge of every device and increases costs. Radio communication requires a transceiver in each device and an undisclosed method for determining relative location. Use of a GPS requires sophisticated hardware and software, satellite communication and pinpoint accuracy which is unavailable in GPS devices. Hard coding the location of each device into software or hardware greatly limits flexibility. In general, while Adler discloses some ideas for determining relative location without physical contact, no concrete details are presented.

A more recent technology available from Anywise Enterprise LLC is a product named "The Matrix." This product will play back any animation that you create across a number of merged tablet screens. But, the user is required to configure each tablet manually (a "hard" configuration) in order to tell the tablet where it falls in relative position to the other tablets in order to create the video wall. Any position change of the tablets requires manual reconfiguration. Further, the product is unintuitive and only that particular product is then able to use the video wall. While such a technology may be useful, it is very limited, is inflexible and requires manual configuration by a user.

Accordingly, a technique is desired that would allow tablet computers (or other computing devices with display screens) to automatically detect their position relative to one another in a flexible and intuitive manner.

SUMMARY OF THE INVENTION

To achieve the foregoing, and in accordance with the purpose of the present invention, a technique is disclosed that automatically detects the relative positions of two or more computing devices to one another.

The technique may be used by a software application running on a computing device, thus enabling any software application to merge display screens of computing devices into one display screen.

In one embodiment, a plurality of computing devices send relevant geographic and identification data to a central computer (located remotely over the Internet or locally via a local area network) which determines that these computing devices shall be grouped to form a video wall. The devices may all send the same password to the central computer indicating that they wish to be grouped together. Once placed next to one another in substantially the same plane, the computing devices snap photographs at more or less the same time and these digital images are transmitted to the central computer. The central computer determines the relative positions of these computing devices and then streams a portion of a video or digital image to each of these devices in order that all devices display the video or image in an integrated fashion.

In another embodiment, a plurality of tablet computers connect to one another over a local area network and elect one of the tablets to serve as the application server. Once placed next to one another in substantially the same plane, the tablets snap photographs at more or less the same time and these digital images are transmitted to the chosen application server. The server tablet determines the relative positions of all tablets and then streams a portion of a video or digital image to each of the tablets in order that all tablets display the video or image in an integrated fashion.

In yet another embodiment, computing devices send information to a central computer as described above which then determines their relative positions. The central computer sends the position information back to one of the computing devices which is then able to transmit a video or digital image to be displayed across all of the computing devices.

Further refinements of these embodiments include determining a projection of one image into another, sorting images that have been compared in order to place them into a grid, and restarting the process if it is determined that one of the computing devices has moved from its initial position.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, the present invention enables two or more tablet computers to automatically detect their positions relative to one another so that their screens may be merged into one, thus creating a single larger screen. The invention is not limited to tablet computers, but may be used with any other suitable computing device such as a desktop computer, laptop computer, mobile telephone, etc., having a display screen. Using a built-in camera of each computing device, a photograph is taken from each device and then the photographs are compared. Assuming that the two computing devices are relatively close to one another, the photographs taken with their cameras should be relatively similar, albeit slightly offset. Assuming that the focal lengths are the same (or fixed), computing devices that have different relative positions (i.e., one is to the left of the other, one is above another) will produce slightly different images. The photographic images are analyzed and the differences taken into account in order to determine the relative positions of the computing devices that have taken the photographs. This technique can be very fast and is portable to other types of computing devices for use with other software applications.

Figure 1:
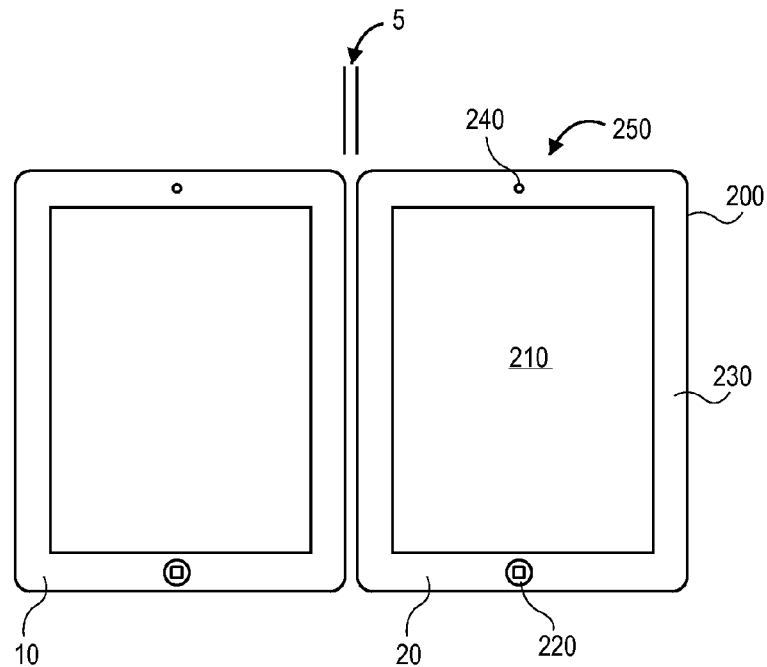
FIG. 1 illustrates two tablet computers side-by-side that may be used to implement an embodiment of the present invention.

FIG. 1 illustrates two tablet computers 10 and 20 side-by-side that may be used to implement an embodiment of the present invention. The convention used herein is that device 10 is considered to be "to the left" of device 20. The present invention will then be able to detect that device 20 is "to the right" of device 10 and display an image, photograph, movie or video across both screens as if they were one screen. Both devices need not be touching although it is preferable that they are in fairly close proximity. In other words, distance 5 need not be zero, but is on the order of approximately 1 inch or less. It has been found that a distance 5 of less than about 20 mm works well for the present invention. For other types of tablet computers, distance 5 depends on the camera focal length and screen border width.

In general, distance 5 will be dictated by the user and is typically adjusted to be as small as possible for better viewing on the merged screens. Further, although both devices are shown having no vertical offset relative to one another (i.e., one being "higher" than the other), a small vertical offset around 20 mm is tolerable. Larger offsets may also be tolerable.

In addition, although both devices are shown having their ages more or less parallel to one another, is not strictly necessary that the edges be perfectly parallel. Edges that are substantially parallel are handled well by the present invention.

Tablet computer 20 is the IPAD brand tablet computer available from Apple, Inc., although other tablet computers such as the SURFACE available from Microsoft Corporation and the GALAXY available from Samsung may also be used. As mentioned, the invention functions well with any other type of computing device (such as a desktop computer, laptop computer, mobile telephone) that incorporates a built-in camera to help the device determine its relative position. In fact, a display screen of a computing device is not strictly necessary, although it is preferable for embodiments where the detection of relative positions will be used to display a photograph, movie, etc.

As shown, computing device 20 includes an exterior case 200 incorporating all of the devices electronic components, a display screen 210 (which may be a touchscreen), a border 230 surrounding the display screen (the border not being strictly necessary), an on-off button 220, a front-facing camera 240, and optionally, a rear-facing camera 250 (not shown). The front-facing cameras are preferably used in one embodiment of the invention, although in another embodiment the rear-facing cameras of the devices to be merged may be used (assuming that there is an image to be viewed, i.e., the devices are not placed flat on a table). In one embodiment, device 20 including the camera may be a simple display screen (of a television or computer, for example) or computer monitor that does not contain computing hardware therein. The invention is still applicable in this situation as well as the digital images taken by the cameras may be transmitted wirelessly or over a cable to a connected computing device such as a computer.

Figure 2:
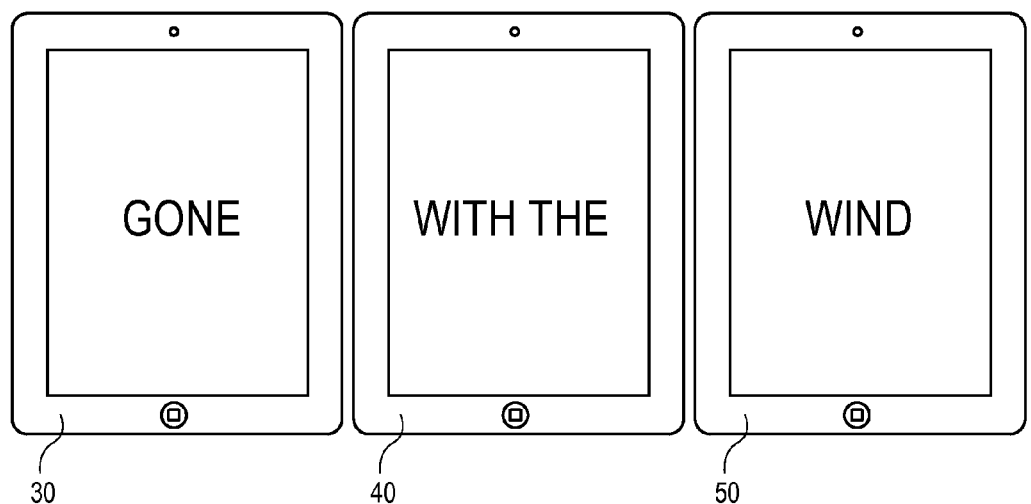
FIG. 2 illustrates three tablet computers side-by-side that may be used to implement an embodiment of the present invention.

FIG. 2 illustrates three tablet computers 30-50 side-by-side that may be used to implement an embodiment of the present invention. Using the convention above, device 40 is to the left of device 50 and device 30 is to the left of device 40. In this embodiment, each camera of each computing device will snap a photograph, the photographs are compared, and a software application will be able to determine the relative positions of each of these devices.

Figure 3:
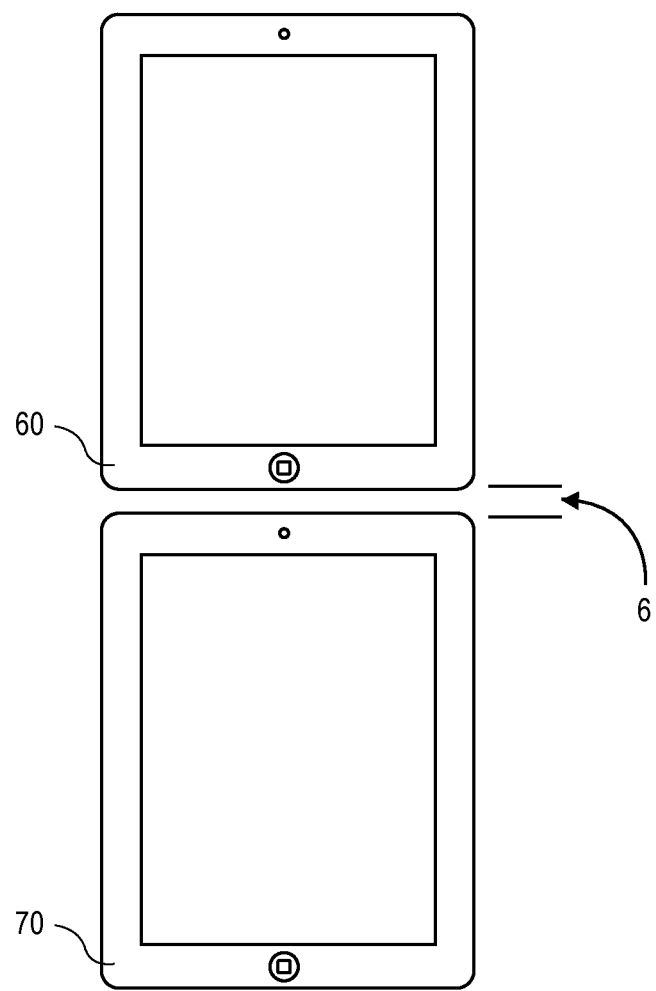
FIG. 3 illustrates two tablet computers, one being on top of another.

FIG. 3 illustrates two tablet computers 60 and 70, one being on top of another. In other words, both are roughly in the same plane (e.g., both lying on a table or one suspended vertically above the other) with one being placed above the other. In this embodiment, the convention used is that device 60 is "on top of" or "above" device 70. Once the relative positions are detected by the present invention, an image or movie may be displayed on both screens as if both screens have been combined into one screen.

Figure 4:
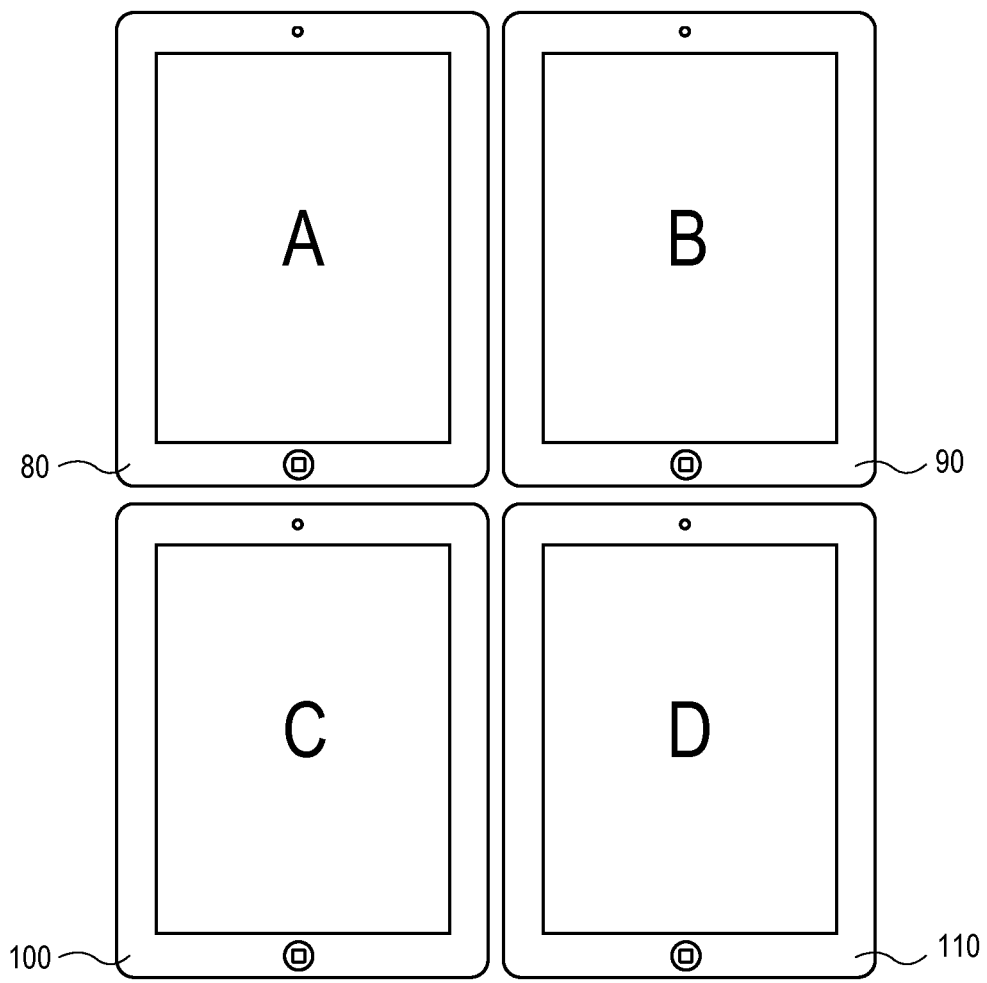
FIG. 4 illustrates four tablet computers that are arranged in a grid.

FIG. 4 illustrates four tablet computers 80-110 that are arranged in a grid. The present invention will detect their relative positions (e.g., device 100 is to the left of device 110, device 110 is below device 90, device 90 is located at the top right corner of device 100) and communicate that information to any suitable software application which desires to display an image or video upon the merged screens. Of course, the devices may form a grid that is a square, rectangular, or other geometric shape.

Any number of computing devices may be arranged in a horizontal row, a vertical row or in a grid as shown, and the present invention will be able to determine their relative positions. As mentioned above, the devices may have their edges touching, may be in close proximity but not touching, may have a slight vertical offset relative to one another when placed in a horizontal row, may have a slight horizontal offset relative to one another when placed in a vertical row, may have edges that are substantially parallel to one another instead of being perfectly parallel, etc.

Figure 5:
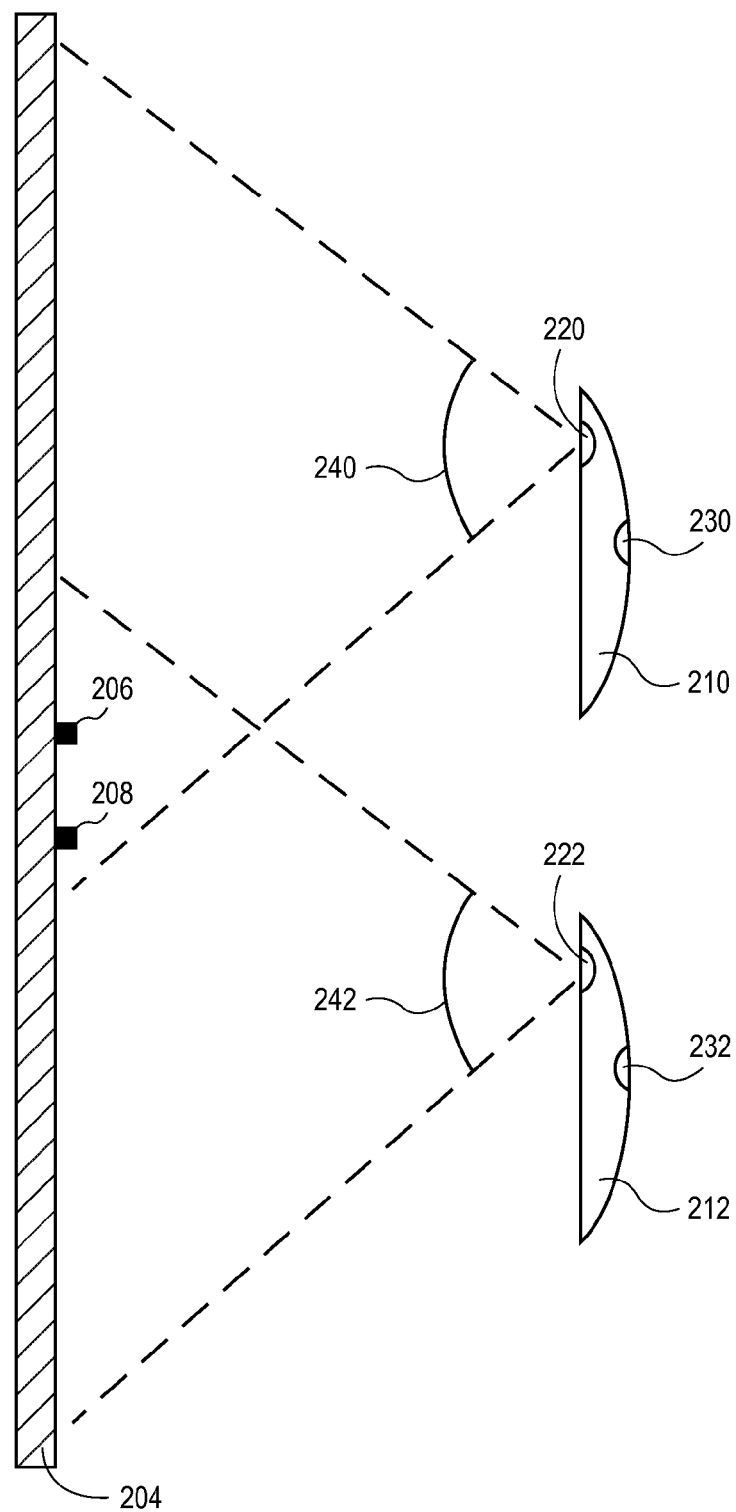
FIG. 5 illustrates photographs being taken by two tablet computers, one above the other.

FIG. 5 illustrates photographs being taken by two tablet computers, one above the other. In this example, a wall 204 (or ceiling, window, other surface or background) includes two protuberances 206 and 208. Facing the wall are two tablet computers 210 and 212, each tablet having a forward-facing camera 220 and 222. Also shown but optional, are rearward-facing cameras 230 and 232 of each tablet. As mentioned earlier, rearward-facing cameras of a computing device may be used instead of forward-facing cameras in order to detect relative positions. The figure is not drawn to scale and although the tablets are shown some distance apart from each other, it is preferable when viewing a combined image or movie on the tablets that the tablets be closer together if not touching.

Depending upon the type of camera in each device, its focal length, and the distance from the device to the background which it is photographing (such as wall 204), each camera will have a field of view that dictates what appears in the final photograph that it takes. As shown, camera 220 has a field of view 240 and camera 222 has a field of view 242. Accordingly, a photograph taken by upper tablet 210 will show both protuberances in the lower portion of the photograph, while a photograph taken by tablet 212 will show both protuberances in the upper portion of its photograph. A comparison of both photographs will then reveal that tablet 210 must be above tablet 212 because of the locations of the protuberances in the photographs. Of course, image analysis of two photographs may be performed upon any image contained within the photographs.

Example Using Four Tablet Computers

Referring back to FIG. 4, showing four side-by-side tablet computers A-D used to display a single integrated image or video, the following figures illustrate how photographs taken from each of these computing devices may be compared in order to determine their relative positions.

Figure 6:
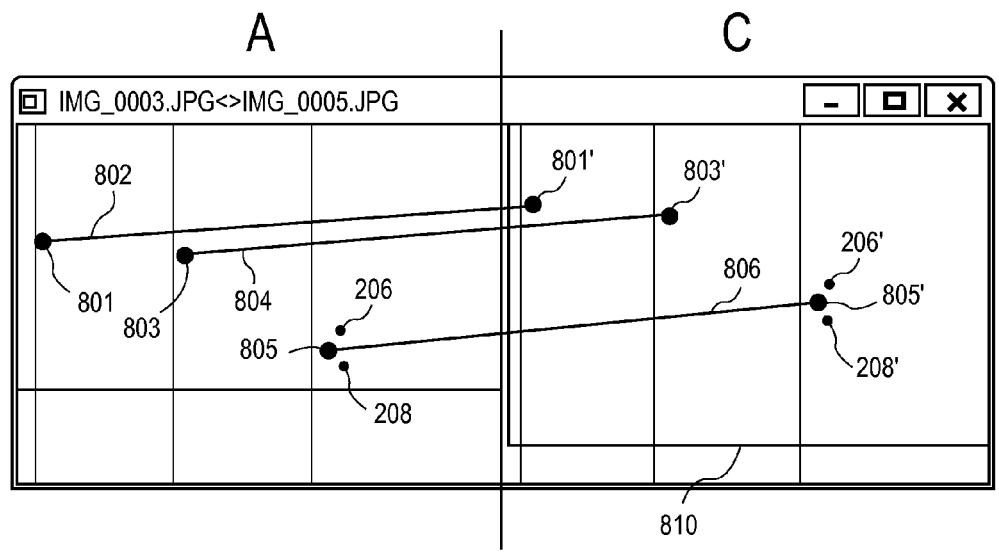
FIG. 6 illustrates a comparison of photographs A and C taken from tablets A and C.

FIG. 6 illustrates a comparison of photographs A and C taken from tablets A and C. As shown, protuberances 206 and 208 appear lower in photograph A compared to the same protuberances 206' and 208' shown in photograph C. Also, features 801, 803 and 805 appear slightly lower than the same features 801', 803' and 805' shown in image C. Angled lines 802, 804 and 806 connecting these same features between the two images help to emphasize that one image is shifted upward relative to the other. These location differences of significant features would indicate that tablet C is located below tablet A which, as shown in FIG. 4, is correct. FIG. 6 shows a projection line 810 in image C indicating where image A would be located.

Figure 7:
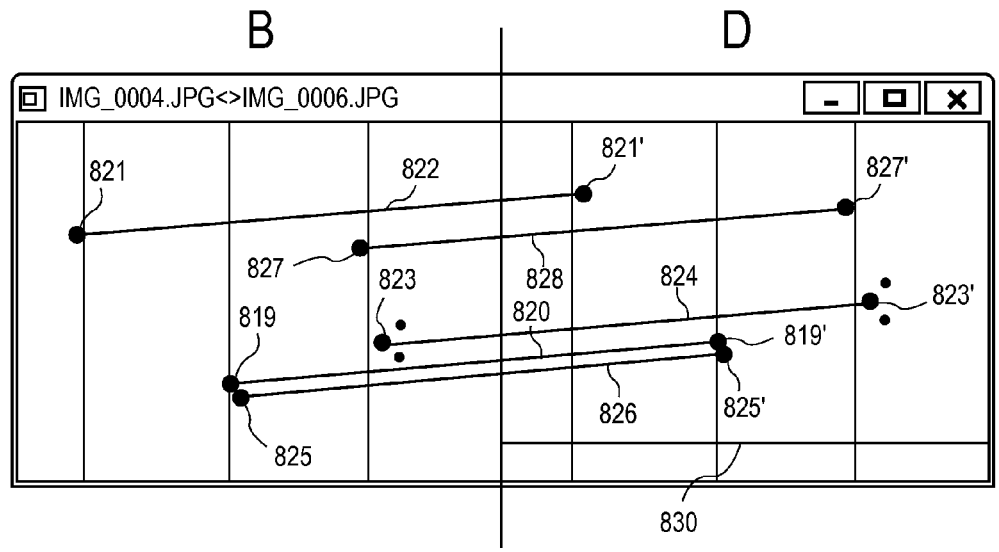
FIG. 7 illustrates a comparison of photographs B and D taken from tablets B and D.

FIG. 7 illustrates a comparison of photographs B and D taken from tablets B and D. As shown, protuberances 206 and 208 appear lower in photograph B compared to the same protuberances shown in photograph D. Also, features 819, 821, 823, 825 and 827 appear lower in image B than their corresponding features in image D. Again, angled lines 820, 822, 824, 826 and 828 connecting these features indicate the displacement between the two images. These location differences would indicate that tablet D is located below tablet B which, as shown in FIG. 4, is correct. FIG. 7 shows a projection line 830 in image D indicating where image B would be located.

Figure 8:
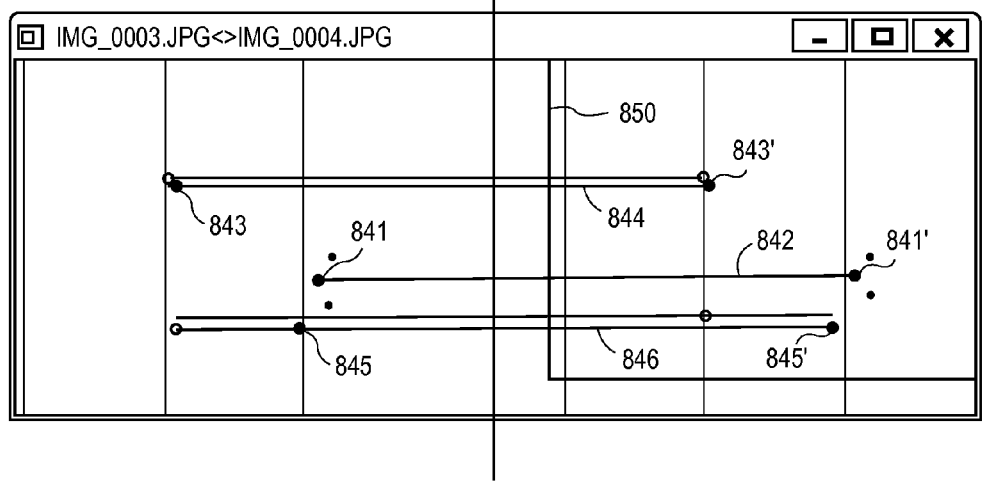
FIG. 8 illustrates a comparison of photographs A and B taken from tablets A and B.

FIG. 8 illustrates a comparison of photographs A and B taken from tablets A and B. As shown, protuberances 206 and 208 appear farther to the left in photograph A compared to the same protuberances shown in photograph B. In addition, features 841, 843 and 845 appear shifted further to the left in image A than their corresponding same features 841', 843' and 845' in image B. Reference lines 842, 844 and 846 appear roughly horizontal because these two images do not have a significant vertical displacement relative to one another. These location differences would indicate that tablet A is located to the left of tablet B which, as shown in FIG. 4, is correct. FIG. 8 shows a projection line 850 in image B indicating where image A would be located.

Figure 9:
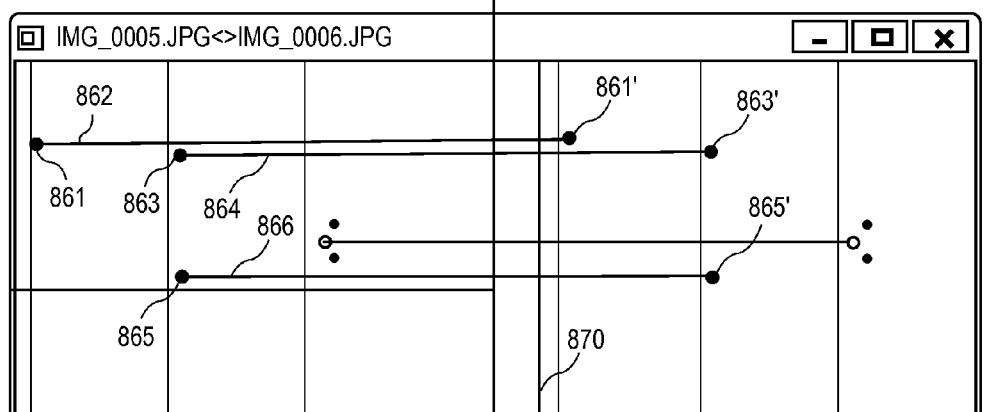
FIG. 9 illustrates a comparison of photographs C and D taken from tablets C and D.

FIG. 9 illustrates a comparison of photographs C and D taken from tablets C and D. As shown, protuberances 206 and 208 appear farther to the left in photograph C compared to the same protuberances shown in photograph D. In addition, features 861, 863 and 865 appear shifted further to the left in image C than their corresponding same features 861', 863' and 865' in image D. Reference lines 862, 864 and 866 appear roughly horizontal because these two images do not have a significant vertical displacement relative to one another. These location differences would indicate that tablet C is located to the left of tablet D which, as shown in FIG. 4, is correct. FIG. 9 shows a projection line 870 in image D indicating where image C would be located.

Figure 10:
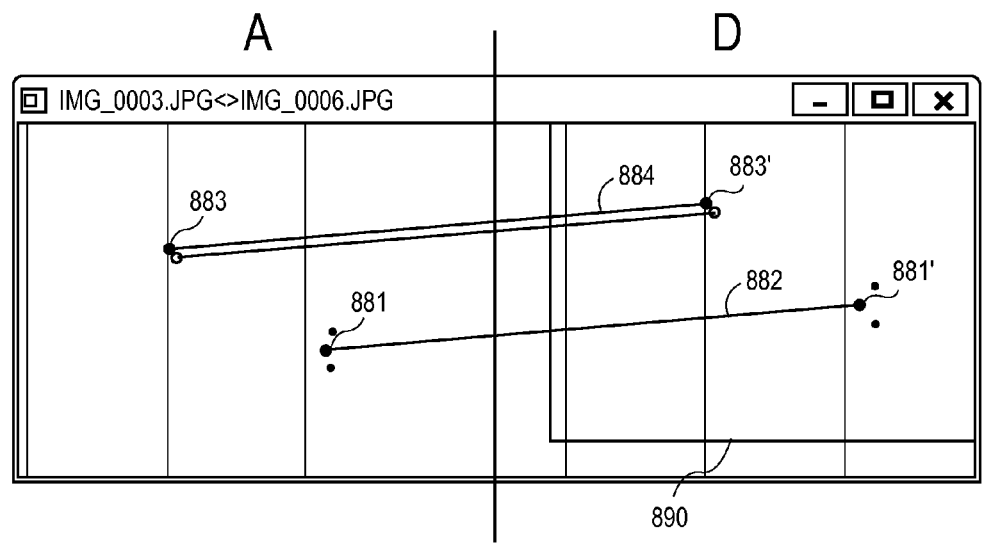
FIG. 10 illustrates a comparison of photographs A and D taken from tablets A and D.

FIG. 10 illustrates a comparison of photographs A and D taken from tablets A and D. As shown, protuberances 206 and 208 show the same displacement as in FIGS. 6 and 8. Further, features 881 and 883 show a displacement down and to the left relative to their corresponding same features 881' and 883' in image D indicating that tablet A is above and to the left of tablet D. FIG. 10 shows a projection line 890 in image D indicating where image A would be located.

Figure 11:
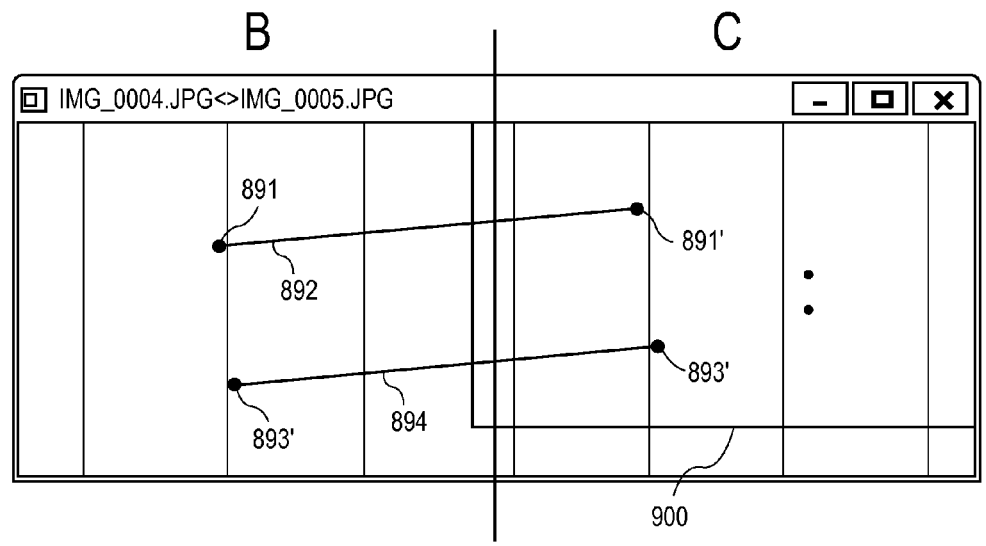
FIG. 11 illustrates a comparison of photographs B and C taken from tablets B and C.

FIG. 11 illustrates a comparison of photographs B and C taken from tablets B and C. As shown, protuberances 206 and 208 show the same displacement as in FIGS. 7 and 9. Further, features 891 and 893 show a displacement down and to the right relative to their corresponding same features 891' and 893' in image C indicating that tablet B is above and to the right of tablet C. FIG. 11 shows a projection line 900 in image C indicating where image B would be located.

Figure 12A:
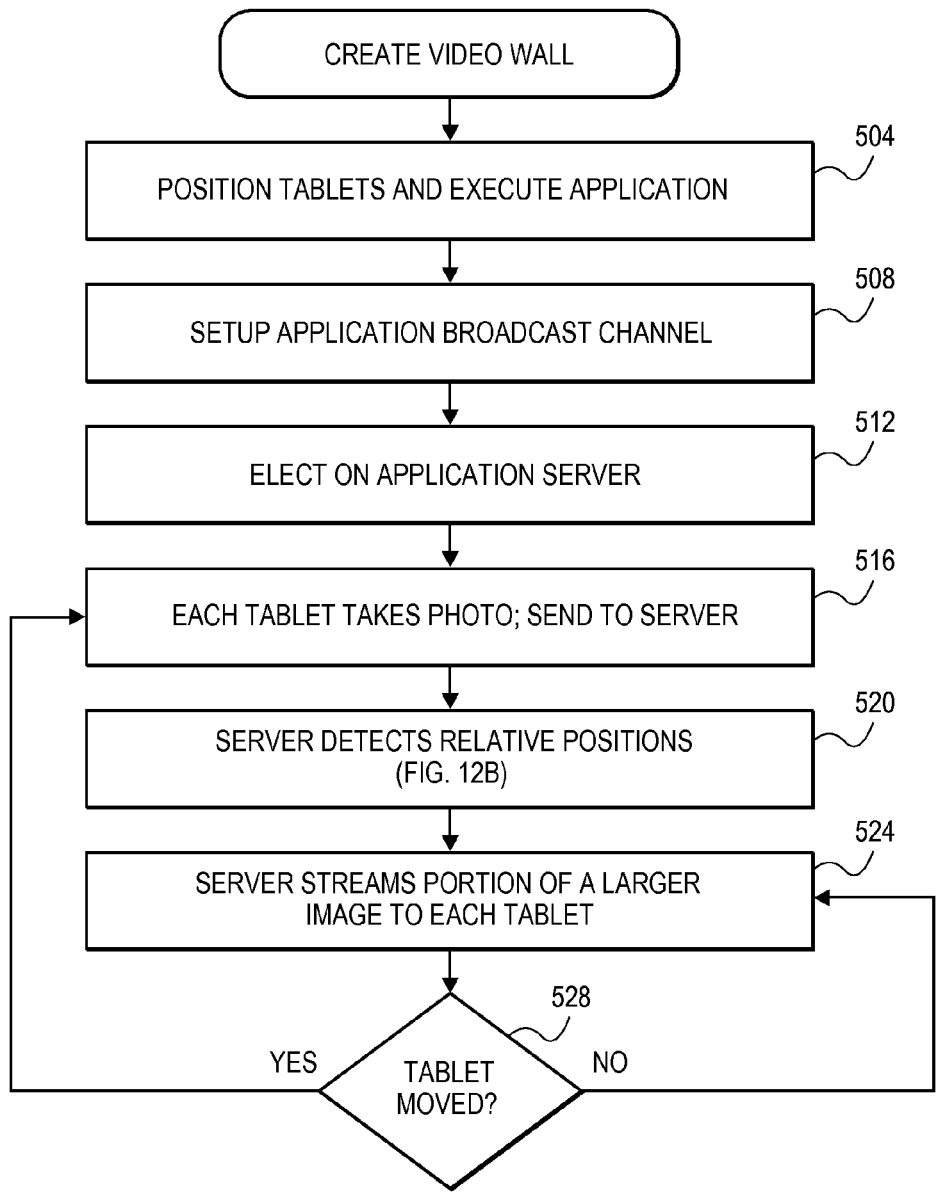
FIG. 12A is a flow diagram describing one embodiment by which a video wall may be created using any number of computing devices.

FIG. 12A is a flow diagram describing one embodiment by which a video wall may be created using any number of computing devices. Although the below description refers specifically to tablet computers, any suitable computing device (as described above) may be used. In step 504 any number of tablet computers are positioned in close proximity and preferably more or less in the same plane (for a better viewing experience). For example, the tablets are placed next to one another on a flat surface such as a table, desk or floor, are placed more or less vertically on a wall, or placed together in a stand or other similar structure so that they may be inclined, etc. It is preferable that the tablets are placed as close as possible to one other to provide a better viewing experience, but it is not strictly necessary that they be touching. Next (or at any time previous), a software application embodying a portion of the present invention is executed upon each tablet.

In step 508 the software application of each tablet sets up a communications channel in order to broadcast a photograph to an application server. If the application server will be a cloud-based central server, then each tablet simply establishes a wired or wireless connection to the Internet as is known in the art. For example, standard TCP/IP may be used over a Wi-Fi network, or each tablet may connect to a local area network. On the other hand, if one of the tablets will serve as the application server, then each tablet may connect to a local area network (wired or wirelessly), or may connect wirelessly to one another using other protocols such as NFC, Bluetooth, infrared, etc.

As part of this step the tablets will be grouped to implement the video wall. In one embodiment, the application server uses data from each tablet to establish the group. For example, each tablet will transmit to the application server its geographic location (using an internal GPS receiver, for example), the time, and its gyroscope reading. The geographic location data provides a fairly close guess as to which tablets are close to one another (on the order of a meter or so, depending upon allowed GPS technology), and the gyroscope data indicates which tablets are within the same plane. The application server may then use this information (or a subset of it) to determine which tablets have been placed close together on a surface to be part of a video wall. In one specific embodiment, the application server may determine that tablets which are relatively close to one another (within about 1 m or less), which have the same gyroscope angle reading (e.g., indicating that they are all placed horizontally a flat surface), and which send their data at about the same time should be grouped together into a video wall. There is little risk in being overinclusive and including a tablet computer that actually is not intended to be part of the video wall (e.g., a tablet that is located on a desk a few feet away), because the detection algorithm described below will then fail to place this tablets in a known position relative to the others and it will be ignored.

In another embodiment, when the software application is executed upon each tablet intended to be part of a particular video wall, an identifier (such as a password) is entered and this password is transmitted to the application server. The application server then groups those tablets together into a video wall which have submitted the same password.

In step 512 the tablets elect an application server to collect the photographs and detect relative positions. The application server may also be the computer that streams portions of a video or image to each tablet computer based upon the relative positions in order to create the video wall. If a cloud-based computer will be the application server then each tablet is provided with the URL for this server by providing the URL as a default within the software application, by accessing a Web site from each tablet, etc. If one of the tablets will be the application server then the tablets communicate amongst themselves using their software applications and use a simple means to choose one of the tablets to be the application server. In a hybrid approach, a cloud-based server can collect the photographs and detect relative positions, transmit this information to one of the tablet computers which then acts as a proxy application server to stream portions of the video or image to the other tablets based upon the known relative positions. It is even possible that a nearby computer connected to the same local area network or available wirelessly may serve as the application server.

In step 516 each tablet takes a photograph using its front-facing camera (or all take photographs using their rear-facing cameras) and sends this photograph to the application server. Preferably, the photographs are taken more or less simultaneously using an internal clock, a command from one of the tablets, or any custom synchronization algorithm in order to synchronize the photography. Of course, taking photographs of a still image (such as a ceiling) does not require perfect synchronization, while photographs of a background in which there is some movement may require perfect synchronization. The digital image captured by each tablet is then transmitted to the application server (i.e., over the Internet to a central server or to one of the tablets) along with an identification of which tablet captured the image.

In step 520 the application server receives the digital images from the tablets and detects their relative positions. The relative position information is then transmitted to the computing device which will actually stream the video or image to the tablets to create the video wall. As mentioned, this computing device may be the cloud server, one of the tablet computers, or a nearby computer. This step is explained in more detail below with reference to FIG. 12B.

In step 524 the application server streams the corresponding portion of the larger video or image to the appropriate tablet computer. Based upon the relative position information determined by the application server, the server now knows which tablet is located where in relation to the other tablets. The overall effect will be that of viewing the video or image in its entirety across the combined screens of all tablet computers. For example, in reference to FIG. 2, the server would know that tablet 40 is in the middle, tablet 50 is to the right and tablet 30 is to the left. The video image may then be split into thirds, with each third being sent to the appropriate tablet so that the video may be viewed across all three tablet computers. Accordingly, the title screen from the movie "Gone with the Wind" would be seen as shown if this movie is being watched.

In another example, if four tablet computers are used and their layout is shown as in FIG. 4, the server would break up the video or image into four portions and stream the top-left quadrant to device A, the top-right quadrant to device B, the lower-left quadrant to device C, and the lower-right quadrant to device D. Any suitable video, image editing software, or custom software may be used that is capable of selecting a portion of a video or image frame and broadcasting it to a particular destination.

It should be noted that streaming in step 524 is not limited to streaming a video. For instance, a still image may be displayed on the video wall, a book may be displayed, a video game may be displayed, a photograph may be displayed for photo processing, etc. In general, any higher-level software application desiring to use multiple screens from similar computing devices may take advantage of the present invention in which case the present invention may be embodied within a supporting library or similar software construct.

If any of the tablets are moved once the photographs have been taken (either before the movie is displayed or after), then step 528 detects that movement. For instance, if the gyroscope or accelerometer (or both) within one of the tablet computers detects that the tablet has moved significantly and is then motionless (perhaps tablet 20 is moved to the other side of tablet 10 as shown in FIG. 1) then the software application within that tablet computer sends a restart command to each of the other tablet computers. The gyroscope detects that the angle of the tablet has changed while the accelerometer detects that acceleration has changed or is nonzero. This restart may be sent over a local area network or local wired or wireless connection as discussed above, or may be sent over the Internet to a central server which then dictates a restart for each of the tablets. Control then moves to step 516 where each tablet takes a new photograph and sends the photograph to the application server. Alternatively, with a computing device having an internal GPS accurate enough to detect location changes on the order of one foot or so, the GPS may be used to detect that the tablet has moved significantly.

Figure 12B:
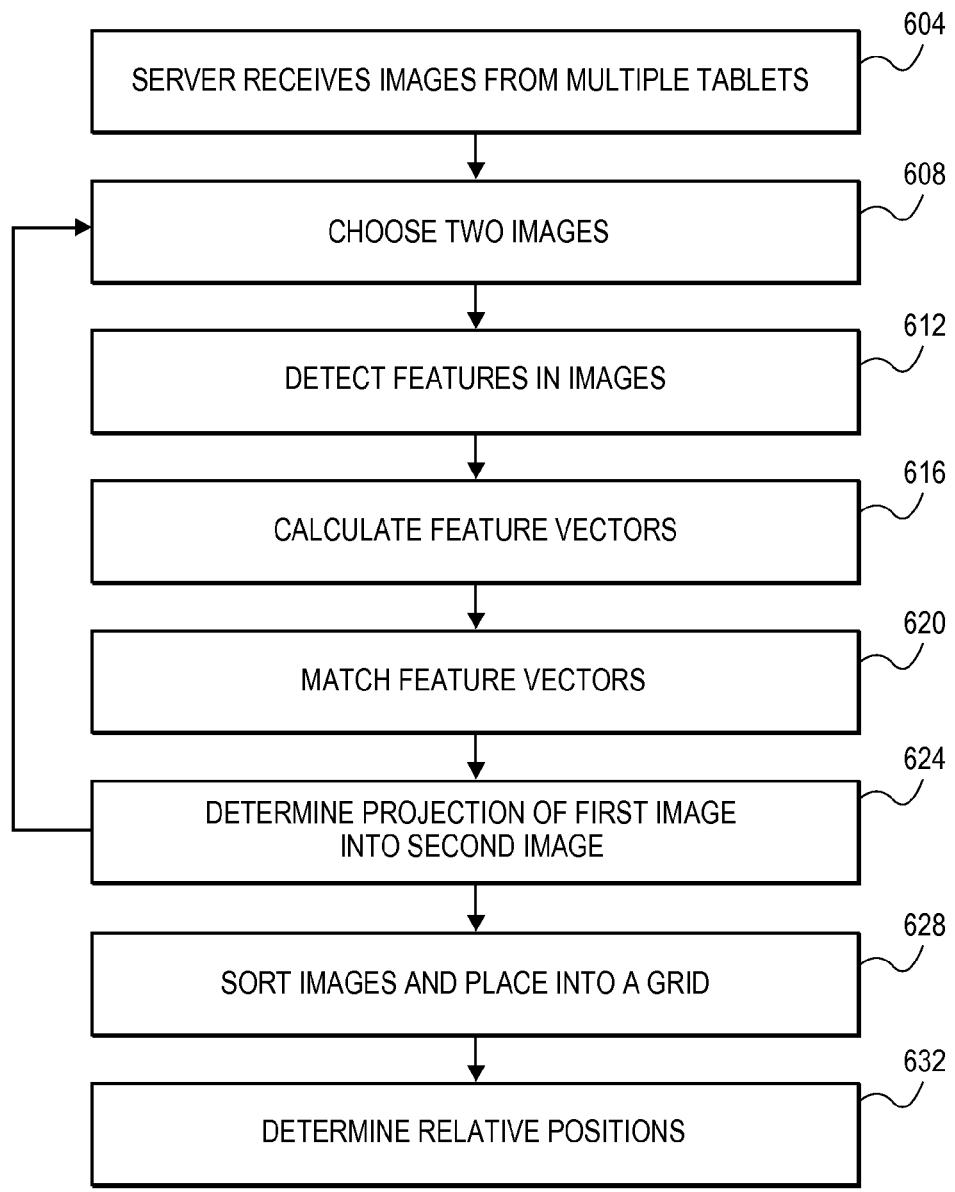
FIG. 12B is a flow diagram describing one embodiment by which a computer determines the relative positions between devices using photographs taken from those devices.

FIG. 12B is a flow diagram describing one embodiment by which a computer determines the relative positions between devices using photographs taken from those devices. In general, an algorithm detects a shift between two images in order to determine the relative positions. For example, FIG. 6 shows how image C is shifted slightly upward relative to image A, indicating that device A is located above device C. Also, FIG. 8 shows how image B is shifted slightly to the right relative to image A, indicating that device A is located to the left of device B. And, FIG. 10 shows how image D is shifted relative to image A.

In general, any suitable image comparison algorithm may be used, in particular one suited for determining a shift or displacement between two images. The algorithm may randomly discover significant features common to both images and then determine their shift between the two images. For example, while FIG. 6 shows three significant features (801, 803 and 805) used for comparison between the two images, FIG. 7 shows five features. The algorithm may be based upon a determination of a shift of these features, based upon an angular displacement of reference lines drawn between corresponding features in the two images, etc.

In one specific embodiment, an algorithm may estimate a projection of one image into the other (based upon feature analysis) in order to determine the relative positions of one device to another. For example, each of FIGS. 6-11 show a projected image line indicating where one image would be located within the other. FIG. 11 shows a projected image line 900 indicating that image B would be shifted up and to the left if projected onto image C, indicating that device B is located above and to the right of device C. In one particular embodiment, software routines from the openSURF software library available online may be used to implement an image processing algorithm in order to detect a projection of one image onto another indicating a position shift between two images.

In step 604 the application server receives a digital image from each tablet in the group forming the video wall (e.g., images A, B, C and D from tablets 80-110). Next, step 608 begins a loop in which two of the images will be compared against each other. Once all images have been compared to one another, the loop exits to step 628. Step 608 chooses two images from among the image pool that have not yet been compared to one another. In general, it is preferable to compare each image to all the others, although performing fewer than all the possible comparisons is also contemplated. Using the video wall of FIG. 4 as an example, there will be a total of six image comparisons; for the video wall of FIG. 2, there will be a total of three image comparisons. In general, the number of image comparisons needed will increase the greater the number of tablet computers.

In step 612 the algorithm detects significant features (or keypoints) in each of the two images using an algorithm such as the SURF Detector. In step 616 the algorithm calculates a feature vector (or descriptor) for each detected feature. In step 620 the algorithm attempts to match these feature vectors (or descriptor vectors) between the two images using a technique such as a brute force matcher. Next, in step 624 the algorithm determines the homography between the two images using the matched feature vectors. In other words, the algorithm determines a potential projection of one image on to the other. This can be seen, for example, in FIG. 8 where projection line 850 indicates a probable projection of image A onto image B. As explained earlier, this projection line indicates that it is likely that device A is to the left of device B. Once a projection has been determined for a pair of images and their relative location have been determined, control returns to step 608 to compare two more images from the image pool.

Next, in step 628 the images are sorted and placed into a grid. Of course, dealing with only two images is simplistic while dealing with four or more images will be more complex. Once the relative positions between pairs of images are known, the images may be sorted in a variety of manners. In one embodiment, only those pairs of images are selected for which a projection indicates that the two images have a top-to-bottom or left-to-right relationship. Using FIG. 4 is an example, image pairs AB, CD, AC and BD would be retained, while image pairs AD and CB would be discarded. This embodiment is used as it can be easier to calculate a top-to-bottom or left-to-right relationship rather than a diagonal relationship, and such a relationship will generally be more accurate. Also, the final grid can be assembled typically without using the diagonal relationships.

Next, the retained image pairs are sorted into chains of images according to their distances, that is, their descriptor vector distances. A chain is a horizontal or vertical row of images (e.g., AB or BD) and is more relevant and useful when more than two devices are found in a given row or column of the video wall. For example, FIG. 2 shows that device 30 is to the left of both devices 40 and 50. The descriptor vector distances will indicate that device 50 is further to the right of device 30 the device 40. Another way to look at this is to understand that the projection lines for images from devices 30 and 40 into the image for device 50 will be in different locations. In general, a vector distance, (assuming a top-to-bottom or left-to-right offset) indicates the offset between the two images (measuring from one projection line to another, for example). Thus, a vector distance (or an average vector distance) can be used to compare the distance between any two images. Or, the distance from the projection line in one image is measured to the border of the image and then compared with another distance from another projection line to the border.

Once these chains are determined (e.g., chains AB, CD, AC and BD in the example of FIG. 4), they may be placed into a grid representing the video wall, such as the grid shown in FIG. 4. In other words, if it is known that images AB and CD form horizontal chains, and it is also known that images AC form a vertical chain, then is a simple matter to conclude that the grid shown in FIG. 4 is the correct grid for the video wall. Once this grid is determined, then in step 632 a final determination can be made as to the relative positions of the devices. In other words, if there are four devices, the final determination may be that: device A is in the top left, device B is in the top right, device C is in the lower left, and device B is in the lower right. This final determination of relative positions may then be used by the application server if it is the application server which will stream a video or image to all tablets, or the final determination may be sent to a proxy application server or to one of the tablets.

Computer System Embodiment

Figure 13A:
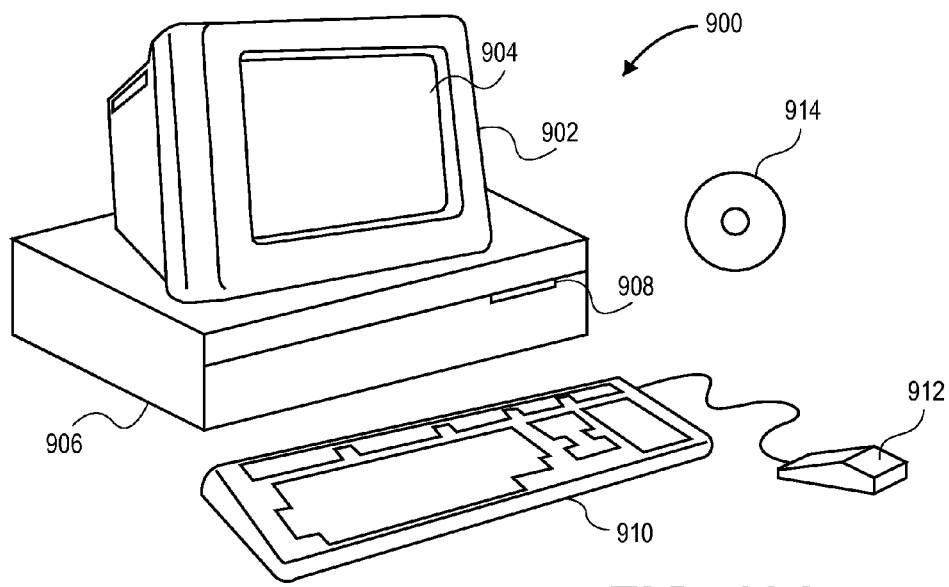
FIG. 13A shows one possible physical form of the computer system.
Figure 13B:
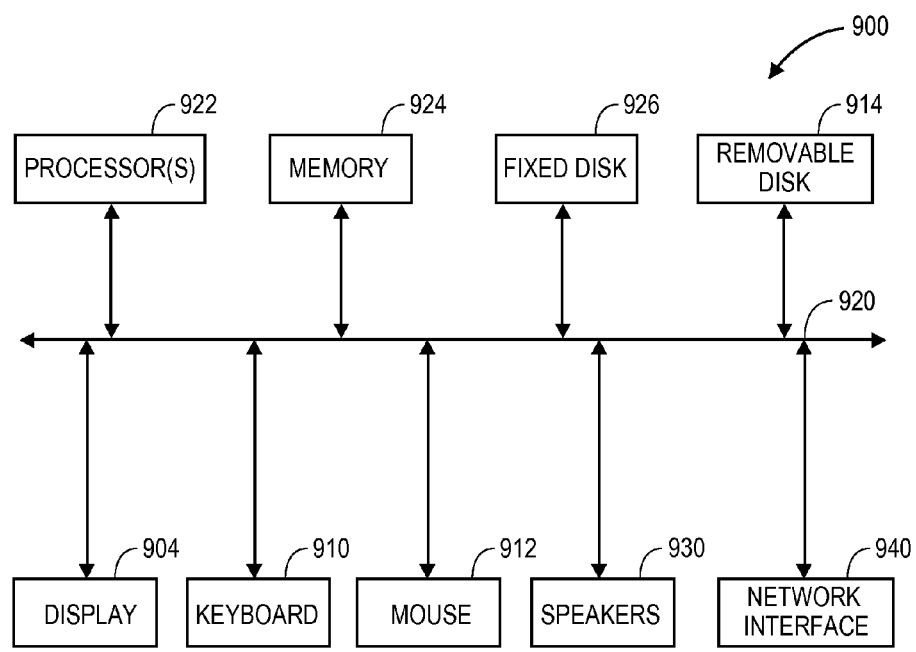
FIG. 13B is an example of a block diagram for the computer system.

FIGS. 13A and 13B illustrate a computer system 900 suitable for implementing embodiments of the present invention. FIG. 13A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 13B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of displaying an image across a plurality of computing devices, said method comprising:
   receiving, at an application server, a plurality of photographs taken from said computing devices, each computing device producing a single one of said photographs;
   comparing said photographs to one another;
   determining relative positions of said computing devices to one another based upon said comparing;
   dividing a digital image into a plurality of discrete portions, each of said portions designated for one of said computing devices;
   transmitting said portions of said digital image to said computing devices, each computing device receiving its designated portion of said digital image;
   displaying said discrete portions across said computing devices wherein said digital image is displayed correctly across said computing devices; and
   moving a single one of said computing devices and continuing to display said digital image correctly across said computing devices.

2. The method as recited in claim 1 wherein said computing devices are located in approximately the same plane, are in close proximity, and have their display screens facing the same direction.

3. The method as recited in claim 1 further comprising:
   forming a group using data from said first and second computing devices that includes at least one of geographic location information from said devices, gyroscope information from said devices, and timing of a request to join said group.

4. The method as recited in claim 1 further comprising:
   determining said relative positions by forming subsets of said computing devices into chains of contiguous devices.

5. The method as recited in claim 1 wherein said application server is distinct from said computing devices or wherein said application server is one of said computing devices.

6. A method of displaying a video across a plurality of computing devices, said method comprising:
   receiving, at one of said computing devices, a plurality of photographs taken from said computing devices, each computing device producing a single one of said photographs;
   comparing said photographs to one another;
   determining relative positions of said computing devices to one another based upon said comparing;
   receiving, at said one computing device, said video from a server computer;
   spatially dividing said video into discrete portions; and
   transmitting said portions of said video to said computing devices based upon said determination of said relative positions, wherein said video is displayed correctly across said computing devices.

7. A method of displaying a video across a plurality of computing devices, said method comprising:
   receiving, at an application server, a plurality of photographs taken from said computing devices, each computing device producing a single one of said photographs;
   comparing said photographs to one another;

determining relative positions of said computing devices to one another based upon said comparing;

dividing said video into a plurality of sets of discrete portions, each of said sets designated for one of said computing devices;

transmitting said sets of discrete portions of said video to said computing devices, each computing device receiving its designated set of discrete portions of said video;

displaying said sets of discrete portions across said computing devices wherein said video is displayed correctly across said computing devices; and moving a single one of said computing devices and continuing to display said video correctly across said computing devices.

8. The method as recited in claim 7 wherein said computing devices are located in approximately the same plane, are in close proximity, and have their display screens facing the same direction.

9. The method as recited in claim 7 further comprising:
forming a group using data from said first and second computing devices that includes at least one of geographic location information from said devices, gyroscope information from said devices, and timing of a request to join said group.

10. The method as recited in claim 7 further comprising:
determining said relative positions by forming subsets of said computing devices into chains of contiguous devices.

11. The method as recited in claim 7 wherein said application server is distinct from said computing devices or wherein said application server is one of said computing devices.

12. The method as recited in claim 7 further comprising:
moving at least one of said computing devices.

13. The method as recited in claim 7 further comprising:
moving at least one of said computing devices.

* * * * *